United States Patent [19]

Crumpler, Jr. et al.

[11] 4,140,422
[45] Feb. 20, 1979

[54] PLASTIC CORRUGATED DRAINAGE PIPE

[76] Inventors: Houston L. Crumpler, Jr.; John M. Crumpler, both of P.O. Box 68, Roseboro, N.C. 28382

[21] Appl. No.: 730,838

[22] Filed: Oct. 8, 1976

[51] Int. Cl.² .................. E02B 13/00; F16L 37/24
[52] U.S. Cl. ................................. 405/49; 285/401; 285/DIG. 22
[58] Field of Search ................. 61/10, 11, 12, 13; 285/401, 423, DIG. 4, DIG. 22

[56] References Cited

U.S. PATENT DOCUMENTS

| | | | |
|---|---|---|---|
| 3,747,352 | 7/1973 | Maroschak | 61/10 |
| 3,855,799 | 12/1974 | Martin et al. | 61/11 |
| 3,929,359 | 12/1975 | Schmunk et al. | 285/401 |
| 3,950,014 | 4/1976 | Doubleday | 285/DIG. 22 |

FOREIGN PATENT DOCUMENTS

2262994  7/1974  Fed. Rep. of Germany .............. 61/11

Primary Examiner—Mervin Stein
Assistant Examiner—David H. Corbin
Attorney, Agent, or Firm—Strauch, Nolan, Neale, Nies & Kurz

[57] ABSTRACT

A corrugated plastic drainage pipe in which drainage holes are formed through raised reinforcing formations on the corrugated pipe periphery and in which each of the reinforcing formations is integrally joined to adjacently disposed ridges or ribs of the corrugations and protrude from the valley therebetween to bridge the valley. Each reinforcing formation terminates in an end face which peripherally surrounds the drainage hole through the reinforcing formation and which is adapted to seat against surrounding soil or other material in a buried installation. Support feet formations are integrally formed with the corrugated pipe and are adapted to seat on a pipe-supporting surface to support the pipe.

13 Claims, 13 Drawing Figures

PLASTIC CORRUGATED DRAINAGE PIPE

FIELD OF INVENTION

This invention relates to molded corrugated plastic drainage pipes which are particularly adapted for use in buried septic tank distribution fields and similar distribution systems.

BACKGROUND

Prior to this invention a wide variety of different molded corrugated plastic drainage pipe constructions have been purposed. Some examples of these prior constructions are described in the following U.S. patents: U.S. Pat. No. 3,753,352 (issued on Aug. 21, 1973), U.S. Pat. No. 3,861,153 (issued on Jan. 21, 1975), U.S. Pat. No. 3,885,799 (issued on Dec. 24, 1974), U.S. Pat. No. 3,861,152 (issued on Jan. 21, 1975), U.S. Pat. No. 3,832,855 (issued on Sept. 3, 1974), U.S. Pat. No. 3,802,202 (issued on Apr. 9, 1974), U.S. Pat. No. 3,747,352 (issued on July 24, 1973), U.S. Pat. No. 3,878,685 (issued on Apr. 22, 1975), U.S. Pat. No. 3,843,758 (issued on Oct. 22, 1974), U.S. Pat. No. 3,897,090 (issued on July 29, 1975), U.S. Pat. No. 3,929,359 (issued on Dec. 30, 1975), U.S. Pat. No. 3,926,222 (issued on Dec. 16, 1975), U.S. Pat. No. 3,789,615 (issued on Feb. 5, 1974), U.S. Pat. No. Des. 235,100 (issued on May 13, 1975), and U.S. Pat. No. Des. 235,103 (issued on May 13, 1975).

Thin-walled corrugated plastic drainage pipe of the type shown in these patents is particularly desirable for use in septic tank distribution systems on account of its lightweight, inexpensive construction. The lightweight, thin-walled construction is achievable because the corrugations add substantial strength to the pipe.

In the past, however, two problems have been encountered with corrugated plastic drainage pipe, particularly in the use of the pipe in buried septic tank distribution systems. One problem pertains to the clogging of the pipe's drainage holes to impair the drainage capacity of the pipe. The other problem involves the impairment of the pipe's structural strength and particularly to the pipe's crushing strength due to the location and size of the drainage holes.

In some corrugated drainage pipe constructions, such as the one described in U.S. Pat. No. 3,830,373, the drainage holes are located entirely in the roots or valleys of the corrugations. These drainage holes, according to U.S. Pat. No. 3,878,685, tend to clog because of their relatively small size. Enlarging the drainage holes to avoid clogging, however, is said in U.S. Pat. No. 3,878,685 to sever adjacent corrugations for the customary longitudinal spacing of the ribs or ridges of the corrugations. This weakens the strength of the pipe.

The solution offered by U.S. Pat. No. 3,878,685 to this problem is to provide the drainage holes in widened uncorrugated areas or flats. The uncorrugated flats are at the root level and are located at spaced apart intervals along the pipe between corrugated portions of the pipe. This solution, however, reduces the number of corrugations on the pipe. It additionally concentrates the drainage holes in confined regions of the pipe so that the holes are not uniformly distributed along the entire length of the pipe.

In another type of corrugated plastic drainage pipe construction (see U.S. Pat. No. 3,861,152) the ribs or ridges are circumferentially interrupted and the drainage holes are located in the interrupted regions. The interruptions of the ribs, however, are noted in U.S. Pat. No. 3,861,152 to weaken the pipe.

Placement of the drainage holes in the two foregoing patents permits liquid or effluent to flow circumferentially around the pipe in the valleys or root-level channels between ridges of the corrugations. This placement was discovered in the present invention to promote clogging of the bottom drainage holes (those holes facing vertically downwardly toward the pipe-supporting surface). In particular, it was found that effluent draining from the other sidewardly facing drainage holes is channeled to the bottom of the pipe and thus collects in the region of the bottom drainage holes. This collection of effluent forms iron oxide which tends to clog the bottom holes.

The iron oxide deposits result in the build-up of a black, gelatinous sludge in the valleys or root-level channels between ridges of the corrugations to promote clogging of the drainage holes.

SUMMARY OF THE INVENTION

This invention provides a solution to the foregoing problems by forming the drainage holes in raised reinforcing formations on the corrugated pipe periphery. Each reinforcing formation is integrally joined to adjacently disposed ridges or ribs of the corrugations and protrudes from the valley or root therebetween to the bridge or traverse the valley.

The reinforcing formations are raised sufficiently so that the drainage holes are at least approximately at the level of the ridges or ribs of the corrugations. This construction significantly inhibits clogging of the drainage holes because the drainage holes are raised above the valley regions where the above-mentioned block, gelatinous sludge tends to accumulate. Preferably, each reinforcing formation protrudes slightly beyond the ridges and terminates in a flat or slightly curved end surface peripherally surrounding the drainage hole. These end surfaces are adapted to seat against the earth, crushed stone or other material in a buried pipe installation to inhibit flow of effluent or liquid into the valleys between the ridges of the corrugations. As a result, accumulation of effluent in the valleys and in the region of the bottom drainage holes is inhibited to further retard clogging.

In the present invention, the raised reinforcing formations add to the structural strength of the corrugated pipe and particularly improve the pipe's crushing strength by virtue of being integrally joined to and extending between adjacently disposed ribs or ridges of the corrugations. The drainage holes are formed through the raised reinforcing formations along an axis that lies about midway between adjacently disposed ribs or ridges of the corrugation. To further reduce clogging, the drainage holes may advantageously be made larger than the longitudinal spacing of the valley portions in the corrugated pipe.

In the preferred embodiment, the diameters of the drainage holes are about equal to the longitudinal spacing between center lines of adjacently disposed ridges for the customary spacing of the ridges or ribs in the corrugated section of the pipe. Although this drainage hole size partially severs adjacently disposed ridges in the corrugations, the crushing strength of the pipe is not objectionably impaired because of the added strength afforded by the reinforcing formations.

In the present invention, the ridges of the corrugations are not circumferentially interrupted as in U.S.

Pat. No. 3,861,152. Additionally, the drainage holes are sized so that they are not greater than approximately the longitudinal spacing between center lines or crests of adjacently disposed ridges in the corrugations. This construction provides uninterrupted, unsevered annular ridge portions which act as dams to block or impede flow of liquid into valley regions between the drainage holes.

The hole-defining reinforcing formations may be arranged in a plurality of parallel, spaced apart longitudinally extending rows along the pipe periphery. The formations in each row may furthermore be uniformly staggered with respect to the formations in each other row to provide a uniform distribution of drainage holes along the lower circumferential half of the pipe periphery.

According to another feature of this invention, support foot formations are formed integral with the pipe's corrugated periphery. These foot formations are adapted to seat on the pipe-supporting surface to support the pipe and to oppose rotation or rolling motion of the pipe during installation of the pipe in a trench or other excavation.

In one embodiment, the foot formations are integrally joined to and extend laterally from the reinforcing formations which face downwardly when the pipe is resting on its pipe-supporting surface.

According to another feature of this invention, each descrete length of corrugated drainage pipe is integrally molded with mating male and female coupling end portions of simplified construction for detachably coupling descrete lengths of pipe together. In one embodiment the male and female coupling portions have coacting groove and protrusion formations which enable the male and female portions to be coupled together by slidably inserting the male coupling portion into the female portion and then relatively rotating the male and female coupling portions to a locking position. In another embodiment, the coupling is accomplished by causing the protrusion formation to be received in a hole at the inner end of the groove formation.

With the foregoing in mind a major object of this invention is to provide a novel corrugated plastic drainage pipe which overcomes the previously mentioned problems.

More specifically, an object of this invention is to provide a novel corrugated plastic drainage pipe in which the drainage holes are formed through raised reinforcing formations and in which each raised formation is integrally joined to adjacently disposed ridges of the pipe's corrugations and protrude from the valley portion therebetween to bridge or traverse the valley.

Still another important object of this invention is to provide a novel plastic corrugation drainage pipe wherein the raised reinforcing formations of the preceding object terminate in an end surface peripherally surrounding the drainage hole therethrough and adapted to seat against the earth or other material in a buried pipe installation to retard or inhibit flow of liquid along the pipe periphery and around the valley regions of the corrugations.

Still another important object of this invention is to provide a novel corrugated plastic drainage pipe which is integrally formed with support foot formations to support the pipe on a pipe-supporting surface.

A further object of this invention is to provide a novel plastic corrugated drainage pipe which is integrally formed with male and female coupling portions of simplified construction.

Further objects of this invention will appear as the description proceeds in connection with the appended claims and below-described drawings.

DETAILED DESCRIPTION

Referring to FIGS. 1–4 and 4A, a flexible molded corrugated plastic drainage and distribution pipe 10 incorporating the principles of this invention is generally indicated at 10 and is integrally formed with annular corrugations 12. Corrugations 12 are defined by alternate ribs or ridges 14 and roots or valleys 16. Adjacent ribs and valleys are integrally interconnected by axially facing side wall portions 18. With the possible exception of the coupling ends of the pipe, corrugations 12 are preferably formed throughout the full length of the pipe.

On the exterior of pipe 10, ridges 14 are annular and are purposefully uninterrupted as shown. The outer peripheries of ridge 14 may be flattened as shown.

Ridges 14 are uniformly axially spaced apart and are uniformly diametered. The diameters of valleys 16 are uniform and are less than the diameters of ridges 14.

Pipe 10 may be molded from any suitable plastic material that is preferably durable and of high strength. The wall thickness of pipe 10 is at least approximately uniform throughout its length.

According to one feature of this invention, the corrugated section of pipe 10 is integrally formed with a multiplicity of raised, boss-like, reinforcing formations.

Each formation 19 is integrally joined to adjacently disposed ones of ridges 14 and protrudes radially outwardly from the valley 16 therebetween to bridge or traverse the valley.

A drainage hole 20 is formed through each formation 19 to permit effluent or liquid to drain freely from the pipe into the surrounding area. The reinforcing formations 19 together with their drainage holes 20 are located in the lower circumferential half of pipe 10 when the pipe is properly positioned in the ground as in a trench 22 (See FIG. 1). The size of holes 20 is made large enough to permit free drainage of liquid into the surrounding soil, gravel, crushed stone or coarse cinders in an underground installation. Holes 20 may be of any suitable configuration and are shown to be circular in the illustrated embodiment.

Figure 2:
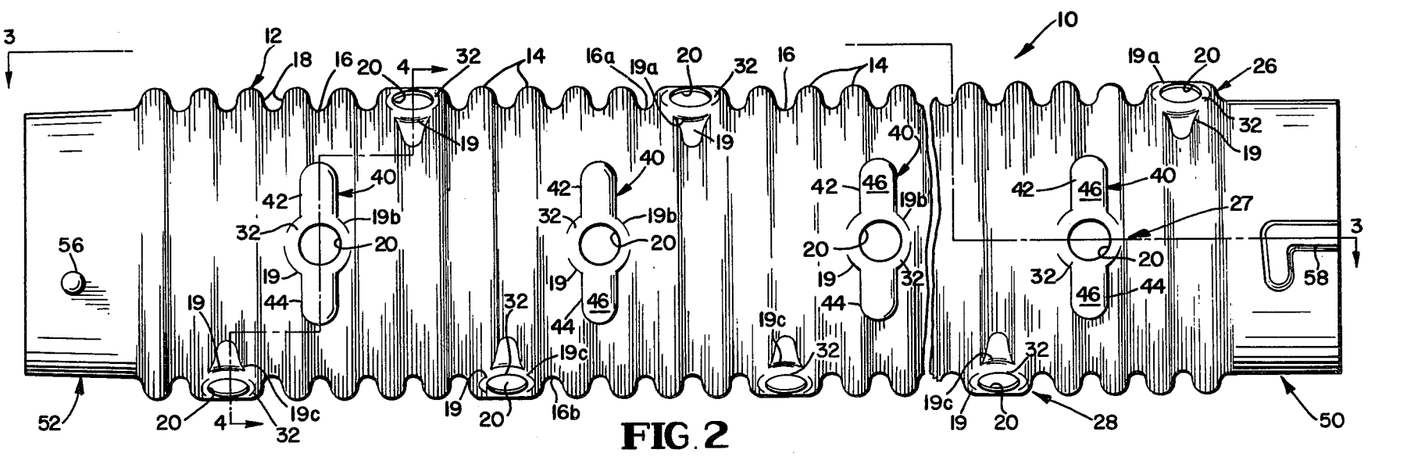
FIG. 2 is a bottom plan view of the corrugated plastic pipe shown in FIG. 1.
Figure 3:
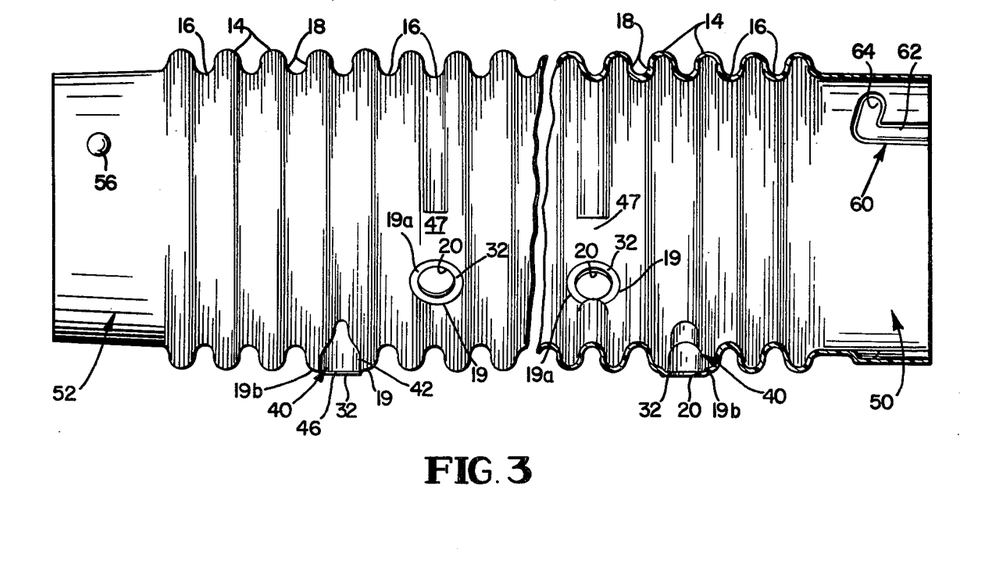
FIG. 3 is a side elevation of the corrugated plastic drainage pipe shown in FIG. 1.
Figures 4, 5, 6, 7, 8, 9:
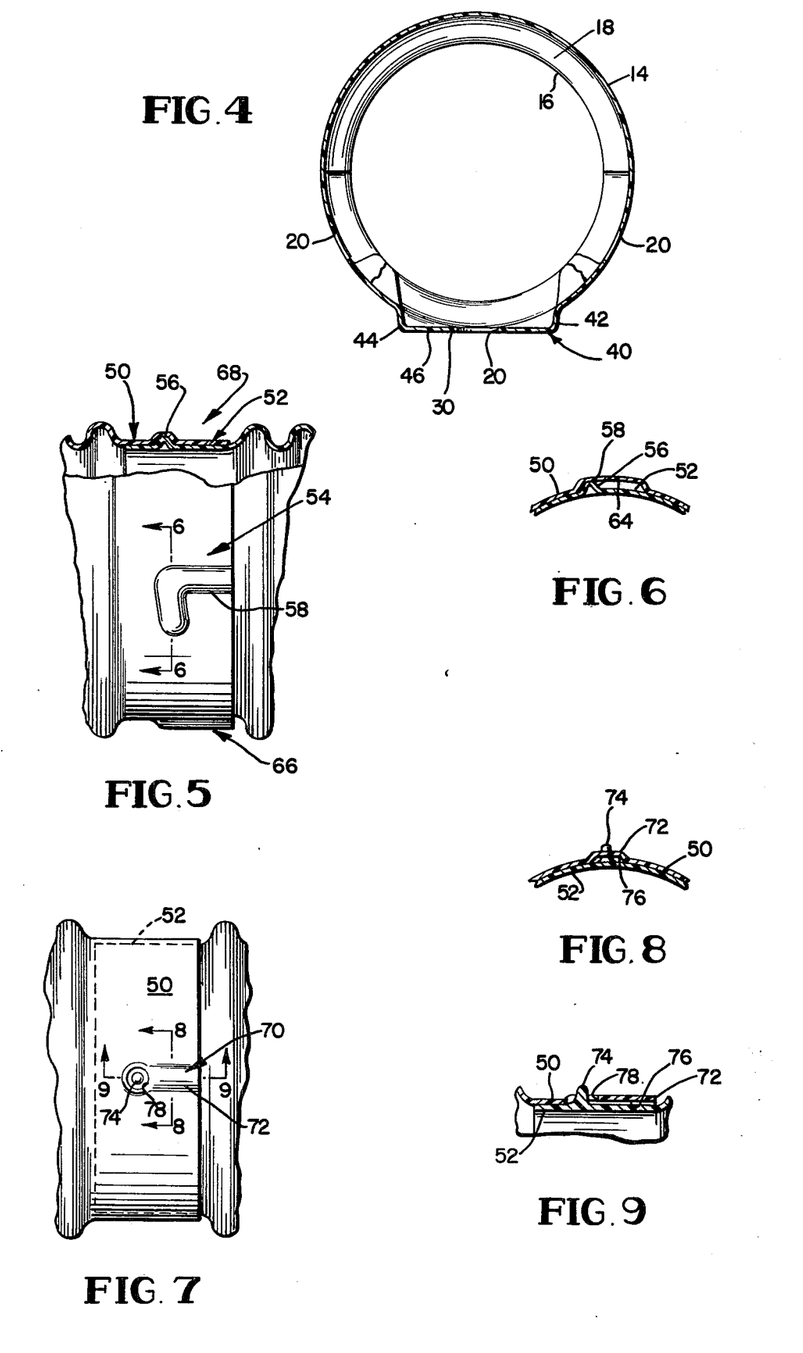
FIG. 4 is a section taken substantially along lines 4—4 of FIG. 2.
FIG. 5 is a fragmentary, partially sectioned view of a pair of coupled corrugated plastic pipes incorporating one embodiment of a coupling structure according to this invention.
FIG. 6 is a section taken substantially along lines 6—6 of FIG. 5.
FIG. 7 is a fragmentary view of a pair of coupled corrugated plastic pipes incorporating another embodiment of the coupling structure according to this invention.
FIG. 8 is a section taken substantially along lines 8—8 of FIG. 7.
FIG. 9 is a section taken substantially along lines 9—9 of FIG. 7.

As shown in FIGS. 2-4, formations 19 together with their drainage holes are arranged in three straight, longitudinally extending, parallel spaced apart rows 26, 27 and 28 along the pipe periphery. The reinforcing formations making up row 26 are indicated at 19a, the reinforcing formations making up row 27 are indicated at 19b, and the reinforcing formations making up row 28 are indicated at 19c.

The two outermost rows 26 and 28 are circumferentially spaced apart by an angle that is less than 180°. In this embodiment, the angular spacing between rows 26 and 28 is about 120°. The intermediate row 27 of reinforcing formations lies midway between rows 26 and 28. For this embodiment, therefore, the angular spacing between rows 26 and 27 and between 27 and 28 is about 60°. As will be described in greater detail shortly, the drainage holes 20 in row 27 face vertically downwardly when the pipe is seated and properly oriented on a pipe-supporting surface.

The formations 19 in each of the rows 26-28 are uniformly longitudinally spaced apart and are uniformly staggered with respect to the reinforcing formations in each of the remaining two rows. Drainage holes 20 are thus arranged in successive groups of three. For the orientation of pipe 10 shown in FIG. 1, the drainage holes in row 27 face downwardly in the bottom portion of the pipe.

Holes 20 are centrally formed through their respective formations 19. Thus, the drainage holes 20 in each of the rows 26-28 are also uniformly longitudinally spaced apart and are also uniformly staggered with respect to the drainage holes in each of the two remaining rows. This arrangement provides a uniform distribution of drainage holes throughout the full corrugated length of the pipe.

Rather than being formed along ridges 14 or in spaces lying circumferentially between circumferential interruptions of ridges (as in U.S. Pat. No. 3,802,202), each of the drainage holes 20 in this invention is formed along a radial axis that lies about midway between adjacently disposed ridges 14 in the region of the valley portion therebetween. Due to the staggered arrangement of formations 19, no more than one drainage hole is located along any given valley 16.

As shown, formations 19, which have a hollow interior, perferably project slightly beyond the outer peripheries of ridges 14 and terminate in an end face 32. End face 32 has an annular configuration and peripherally surrounds the drainage hole that is formed through the reinforcing formation 19. The outer diameter of each end face 32 is greater than the width of the valley bridged by the reinforcing formation, but less that the longitudinal spacing or distance between oppositely facing edges or side walls of adjacently disposed ridges 14. With this construction, portions of each end face 32 overlie regions of adjacently disposed ridges 14.

End faces 32 may be flat or curved somewhat to lie, for example, in a cylindrical envelope. In an underground installation (such as a septic tank distribution system) the end faces 32 seat against the surrounding soil, gravel or crushed stone, to inhibit flow of drained liquid into valleys 16. End faces 32 accordingly perform a sealing function.

To inhibit clogging, the diameters of drainage holes 20 are made larger than the widths of valleys 16 (i.e., the valley dimension extending longitudinally of the pipe). Holes 20, however, are perferably sized so as not to be greater than the longitudinal spacing or dimension between center lines or crests or adjacently disposed ridges 14 in the corrugated pipe section. This longitudinal dimension is referred to as the "pitch" of ridges 14 in the remainder of the description and also in the appended claims. It is understood, however, that use of the term "pitch" herein does not signify that ridges 14 are in the form of a continuous thread. In this embodiment, the diameters of holes 20 are uniform and are about equal to the pitch of ridges 14.

As shown, the longitudinal spacing of formations 19 is such that one imperforate valley (indicated at 16a in FIG. 2) lies between adjacent formations 19a and 19b in rows 26 and 27, respectively. Likewise, one imperforate valley (indicated at 16b in FIG. 2) lies between adjacent formations 19b and 19c in rows 27 and 28, respectively. The imperforate valleys 16a and 16b are continuous and uninterrupted by any raised formations as are the remainder of the valleys in the corrugated pipe section.

With the foregoing construction, ridges 14 and formations 19 act to block or inhibit liquid that passes through the drainage holes in rows 26 and 28 from flowing into and collecting at the region of the drainage holes in row 27. As a result, clogging of the drainage holes in row 27 by the formation of iron oxide or by other effects resulting from collection of liquid is reduced. This construction thus provides for a long clog-free life of a pipe installation to optimize the drainage and distribution of liquid from the pipe.

Formations 19 thus have a number of advantages. First, they structurally strengthen and reinforce pipe 10 in the regions of drainage holes 20 by virtue of being integrally joined to adjacently disposed ridges 16 and bridging the valley therebetween. In particular, the pipe's crushing strength is improved. Formations 19 also resist stretching of the corrugated pipe under the influence of tension forces in a pipe installation.

Formations 19 also define raised flats to making it easier to form drainage holes 20 by drilling or boring after the pipe is molded. Finally, the end surfaces 32 of formations 19 inhibit flow of drained liquid in the previously described manner to retard or inhibit collection of effluent in the region of the bottom drainage holes in row 27.

According to a further feature of this invention each of the formations 19b in row 27 is integrally joined to a pipe support foot 40. Each support foot 40 is formed integral with pipe 10 and comprises a pair of support portions or formations 42 and 44 extending diametrically in opposite directions from the associated formation 19b. Portions 42 and 44 extend laterally of the pipe along valley 16 and protrude from the valley to define a flat bottom surface 46. Surface 46 is adapted to seat on the ground or other pipe support surface and lies approximately in the plane of end face 32. The bottom ground-engaging surface of each foot thus lies in a plane that is parallel to a plane or line extending tangentially of ridges 14. When pipe 10 is laid horizontally, a vertical plane containing the longitudinal axis of a drainage hole in row 27 and normally intersecting the pipe's longitudinal axis medially intersects foot portions 42 and 44 and also formation 19b.

Figure 1:
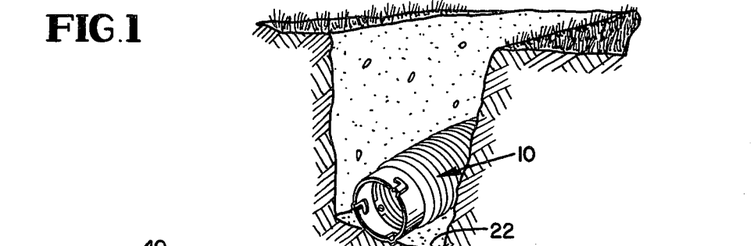
FIG. 1 is a perspective view of a corrugated plastic drainage pipe incorporating the principles of this invention and shown positioned in a trench or excavation prior to being covered with dirt or other material such as gravel or crushed stone.

Feet 40 are adapted to seat on a ground or other support surface to resist rolling or rotation of the pipe during installation and backfilling operations. Feet 40 make the pipe lie flat on a ground support surface and properly angularly orient the pipe so the axes of the drainage holes in row 27 are normal to the support surface. Thus, upon being laid on the surface support during installation, pipe 10 is angularly self-orienting by seating engagement of feet 40 with the support surface. When pipe 10 is laid in a trench as shown in FIG. 1, feet 40 oppose rotation or rolling motion of the pipe due to soil or gravel striking the pipe in the backfilling operation.

Figure 4A:
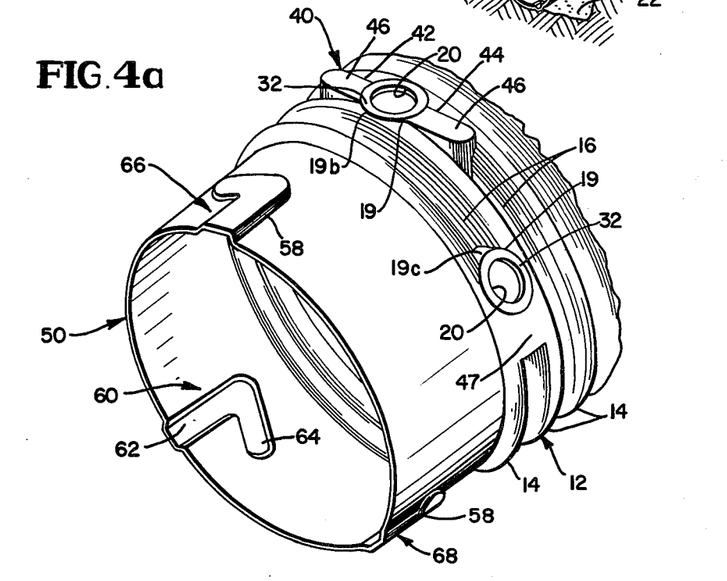
FIG. 4A is an enlarged fragmentary perspective view of the pipe shown in FIG. 2.

As shown in FIGS. 3 and 4A, the pipe's corrugated section may also be integrally formed with a plurality of raised formations 47. Formations 47 are integrally joined to the reinforcing formations 19a and 19c in rows 26 and 28 and extend laterally from the reinforcing formations along valleys 16 to fill short segments of the valleys. Each formation 47 is integrally joined to adjacently disposed ones of ridges 14 and bridges or traverses the valley portion therebetween. Formations 47 oppose the tendency of drained liquid to cling or adhere to the pipe's outer corrugated surface and to flow around the corrugated surface.

As shown in FIGS. 2, 3 and 5, each descrete length of pipe may advantageously be formed with a female coupling portion 50 at one end and a mating, male coupling portion 52 at the other end for coupling descrete lengths of pipe together in an installation. Except for coupling lock formations, the coupling end portions 50 and 52 may each be formed with cylindrically smooth inner and outer peripheries.

In this embodiment, the coupling lock indicated at 54 in FIG. 5 is a bayonet type lock and is shown in FIGS. 2, 3 and 5 to comprise a protrusion 56 and a groove-forming formation 58. Protrusion 56 is integral with and extends radially from periphery of the male coupling portion 52. Formation 58 is integral with the female coupling portion 50 and defines an L-shaped groove 60 for receiving protrusion 56.

Groove 60 opens inwardly into the interior of the pipe and has a straight longitudinally extending section 62 that axially opens at the edge of coupling portion 50 to provide an entrance for protrustion 56. Groove 60 additionally has a circumferentially extending section 64 that intersects with the inner end of groove section 62.

Coupling of two descrete lengths of pipe is accomplished by first aligning the male and female pipe ends such that protrusion 56 is in alignment with groove section 62. The pipes are then relatively axially displaced to receive protrusion 56 in groove section 62. Coupling is completed by relatively rotating the pipes to receive protrusion 56 in groove section 64. Advancement of protrusion 56 to a position where it butts the inner end wall of groove section 64 (see FIG. 6) angularly orients the coupled pipes such that the feet 40 on the coupled pipes are properly positioned in a straight row.

Preferably, more than one coupling lock of the construction described above is provided for. In the preferred embodiment, for example, there are two additional coupling locks as indicated at 66 and 68. Coupling locks 66 and 68 are of the same construction as coupling lock 54. The three coupling locks are preferably equiangular spaced around the pipe circumference.

From the foregoing description it will be appreciated that engagement of protrusions 56 with wall surfaces defining groove section 64 resists relative rotation of the coupled pipes and further cooperates with feet 40 to resist rolling or uncoupling of the coupled pipes due to soil, gravel or the like striking the pipe assembly in a backfilling operation.

As shown in FIG. 5, the inner diameter of the male coupling portion 52 may be made equal to or not less than the inner diameter of the root portions 16 of corrugations 12. This construction avoids the occurrence of inwardly protruding formations which create dams to interfere with the free flow of liquid in the pipe. The outer diameter of the female coupling portion 50 may advantageously be made somewhat less than or not greater than the outside diameter of ridges 14 to avoid the formation of exterior dams which would tend to interfere with the distribution of drained liquid at the exterior of the pipe.

In FIGS. 7-9, an alternate form of coupling lock is shown and is generally indicated at 70. Coupling lock 70 comprises a groove-forming formation 72 on the female coupling portion 50 and a protrusion 74 (which is similar to protrusion 56) on the male coupling portion 52. Formation 72 defines an inwardly and axially opening straight groove 76 which extends only longitudinally of the pipe. A radial hole 78 is formed through the pipe wall near the inner end of groove 76.

In the embodiment of FIGS. 7-9, the diameters of coupling portions 50 and 52 and height of protrusion 74 are such that when protrusion 74 is received in groove 76 by relative axial displacement of the descrete lengths of pipe, there may be some relative flexure due to engagement of protrusions 74 with formation 78. This allows protrusion 74 to pop into hole 78 to couple the two pipes together. More than one coupling lock 70 is preferably provided for on the pipes and are angularly spaced about the pipe periphery to securely couple the pipes together.

Figure 10:
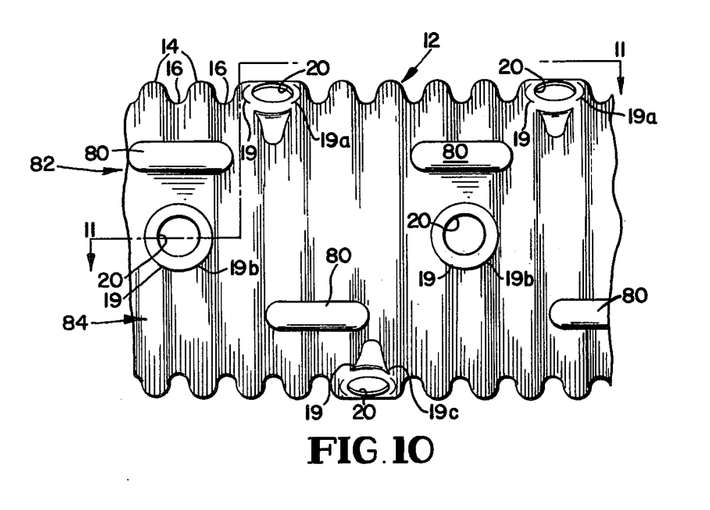
FIG. 10 is a fragmentary bottom plan view of a corrugated plastic drainage pipe, showing another embodiment of foot formations for supporting the pipe.
Figure 11:
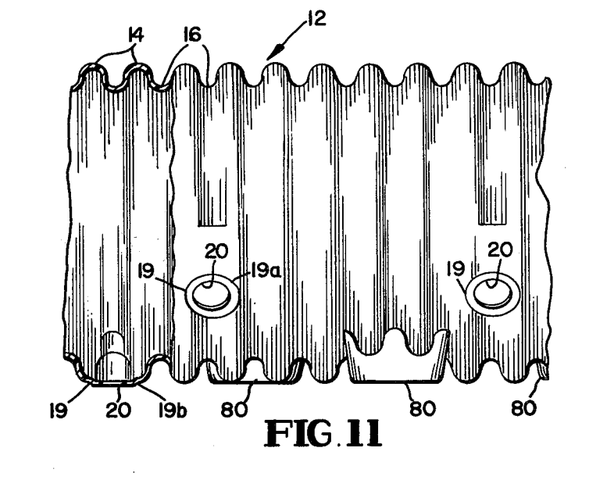
FIG. 11 is a section taken substantially along lines 11—11 of FIG. 10.

An alternate support foot arrangement is shown in FIGS. 10 and 11. In this embodiment, the support feet are indicated at 80 and extend longitudinally of the pipe rather than transversely as in the embodiment of FIGS. 1-4. Feet 80 are integral with pipe 10 and are arranged in two rows 82 and 84. The two rows of feet are disposed on opposite sides of and are equidistantly spaced from a plane containing the pipe's longitudinal axis and extending vertically when the pipe is laid horizontally and supported on the feet. As shown, the support feet in one row may be staggered with respect to the support feet in the other row.

Figure 12:
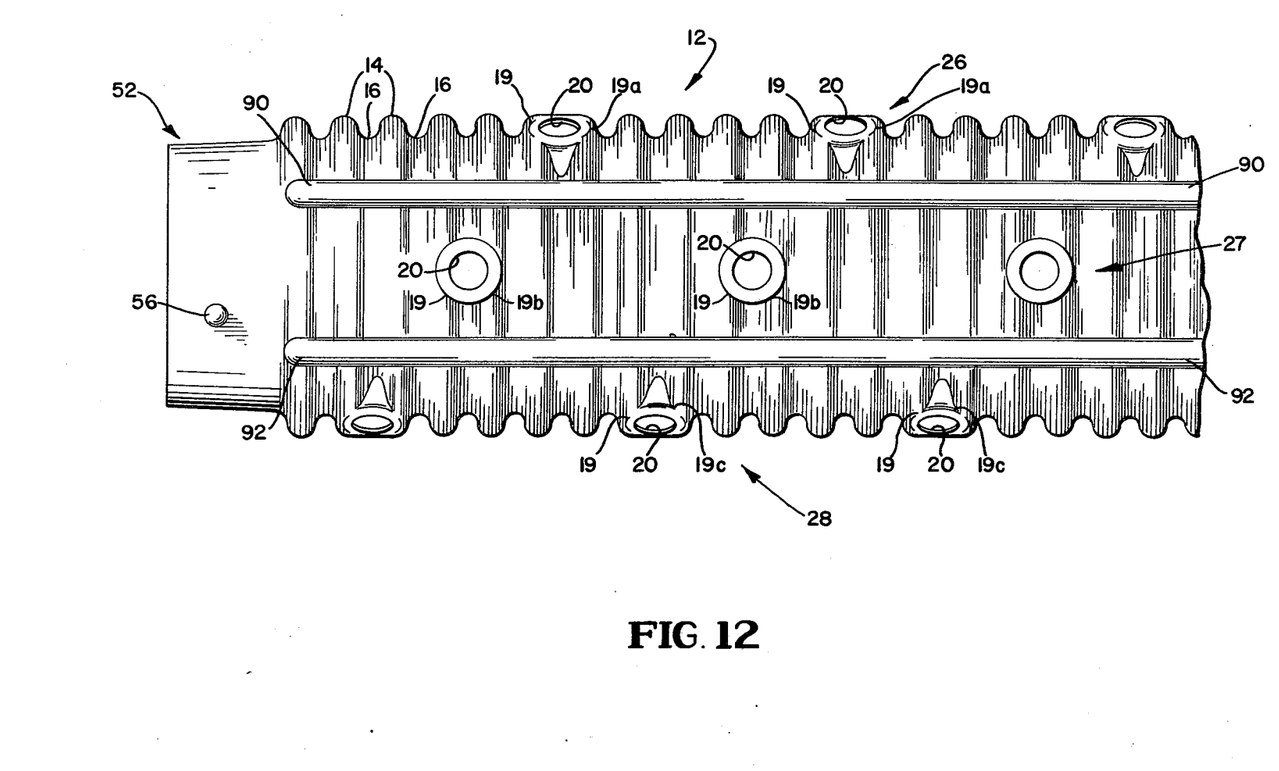
FIG. 12 is a view similar to FIG. 10 and showing still another embodiment of the pipe-supporting foot formations.

Instead of forming the corrugated pipe with several longitudinally spaced apart support feet as shown in the preceding embodiments, the pipe may be integrally provided with a pair of longitudinally extending, parallel spaced support feet in the form of uninterrupted rails as indicated at 90 and 92 in FIG. 12. Rails 90 and 92 are adapted to seat on the ground to support the pipe and perform the same function as feet 80 and 42. Rails 90 and 92 may extend approximately the full corrugated length of the pipe.

In the embodiment of FIG. 12, rails 90 and 92 are preferably disposed on opposite sides of and are equidistantly spaced from a plane containing the pipe's longitudinal axis and extending vertically when the pipe is laid horizontally and supported on the rails. In this embodiment, rail 90 lies between and is parallel to the two drainage hole rows 26 and 27, and rail 92 lies between and is parallel to the two drainage hole rows 27 and 28.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A plastic drainage pipe comprising a corrugated section extending throughout a pre-selected length of the pipe and having an outer periphery formed with alternating, circumferentially extending ribs and valleys, the valleys lying between and interconnecting adjacently disposed ribs, at least a circumferentially extending portion of each rib in said section being annular, and a series of at least three raised, spaced apart formations formed integral with said section on the outer periphery thereof, said formations being arranged in at least one row extending longitudinally of said section, each of said formations extending between and being integrally joined to two of said ribs that lie immediately adjacent to each other to span the one of the valleys lying between the two adjacent ribs, each of said formations protruding outwardly from the valley that it spans at least approximately to the outer circumferences of said ribs, and each of said raised formations being formed with a drainage hole and an end face peripherally surrounding said drainage hole and having an axially extending dimension that is greater than the width of the valley spanned by the raised formation but less than the longitudinal spacing between the oppositely facing side walls of the two adjacent ribs on opposite sides of the valley that the raised formation spans, said dimension of the end face extending longitudinally of said corrugated section, each drainage hole being formed through said section along an axis that lies between adjacently disposed ones of said ribs without interrupting the annularity of at least a circumferentially extending portion of each of the adjacently disposed ones of said ribs to provide for the drainage of liquid from the pipe interior, the diameter of each of said drainage holes being larger than the width of the valley spanned by its associated raised formation, but not greater than the pitch of said ribs, there being at least one valley which lies between each pair of adjacently disposed ones of said formations in said row and which is imperforate at least in the region that extends longitudinally between the adjacently disposed ones of said raised formations.

2. The plastic drainage pipe defined in claim 1 wherein said formations are arranged in a plurality of longitudinally extending, parallel spaced apart rows along the periphery of said section, said formations in each of said rows being longitudinally spaced apart and staggered with respect to the formations in each other row.

3. The plastic drainage pipe defined in claim 1 wherein each raised formation protrudes beyond the outer peripheries of said ribs.

4. The plastic drainage pipe defined in claim 1 wherein said formations are arranged in at least three longitudinally extending, parallel, spaced apart rows along the periphery of said section, the formations in each of said rows being longitudinally spaced apart and staggered with respect to the formations in the other two of said three rows, and the two outermost ones of said rows being circumferentially spaced apart by an angle that is less than 180°, said section further being formed with support foot means integrally joined to and extending from only those formations in the third one of said rows lying between said two outermost ones of said rows, said support foot means being adapted to seat on a pipe-supporting surface to oppose rotation or rolling motion of the drainage pipe on said pipe-supporting surface.

5. The plastic drainage pipe defined in claim 4 wherein said support foot means comprises a pair of foot formations integrally joined to each of the raised formations in said third one of said rows, each pair of foot formations extending along and protruding from the valley which is bridged by the associated raised formation, and the foot formations of each pair being disposed on opposite sides of and extending laterally from the associated raised formation to which they are joined.

6. The plastic drainage pipe defined in claim 1 wherein said section is integrally formed with a plurality of support formations which protrude outwardly from the corrugated periphery of said section and which are adapted to seat on a pipe-supporting surface to oppose rotation or rolling motion of the drainage pipe on said pipe-supporting surface, said support formations extending along and protruding from selected ones of said valleys.

7. The plastic drainage pipe defined in claim 1 wherein said section has additional formations integrally joined to selected ones of the raised formations and extending circumferentially along the valleys which are traversed by the selected ones of said raised formations to fill segments of the valleys for opposing the tendency of drained liquid to cling to and to flow circumferentially around said section.

8. The plastic drainage pipe defined in claim 1 wherein said raised formations are arranged in at least three longitudinally extending, parallel spaced apart rows along the periphery of said section, the two outermost ones of said three rows being circumferentially spaced apart by an angle that is less than 180°, the third one of said three rows lying between and being circumferentially spaced from said two outermost ones of said rows, said section being integrally formed with a plurality of support formations which protrude outwardly from the corrugated periphery of said section and which are adapted to seat on a pipe-supporting surface to oppose rotation or rolling motion of the drainage pipe on said pipe-supporting surface, said support formations being located to support said section in a position where the drainage holes in the raised formations of said third one of said rows face downwardly toward said pipe-supporting surface.

9. The plastic drainage pipe defined in claim 8 wherein said support formations extend longitudinally of said section and are arranged in a plurality of parallel spaced apart longitudinally extending rows.

10. The plastic drainage pipe defined in claim 1 comprising foot formations integrally joined to the raised formations in said row and adapted to seat on a pipe-supporting surface to support the drainage pipe thereon.

11. The plastic drainage pipe defined in claim 10 wherein said row is straight and extends longitudinally.

12. The plastic drainage pipe defined in claim 11 wherein said foot formations protrude from the valleys traversed by the raised formations in said row.

13. The plastic drainage pipe defined in claim 10 wherein two of the foot formations are integrally joined to each of the raised formations in said row on diametrically opposite sides thereof and protrude from the valley that is traversed by that raised formation to which they are integrally joined.

* * * * *